G. T. WHITTEN.
BEEHIVE ENTRANCE GUARD AND SWARM CONTROLLER.
APPLICATION FILED JAN. 29, 1910.
956,615.
Patented May 3, 1910.
2 SHEETS—SHEET 1.
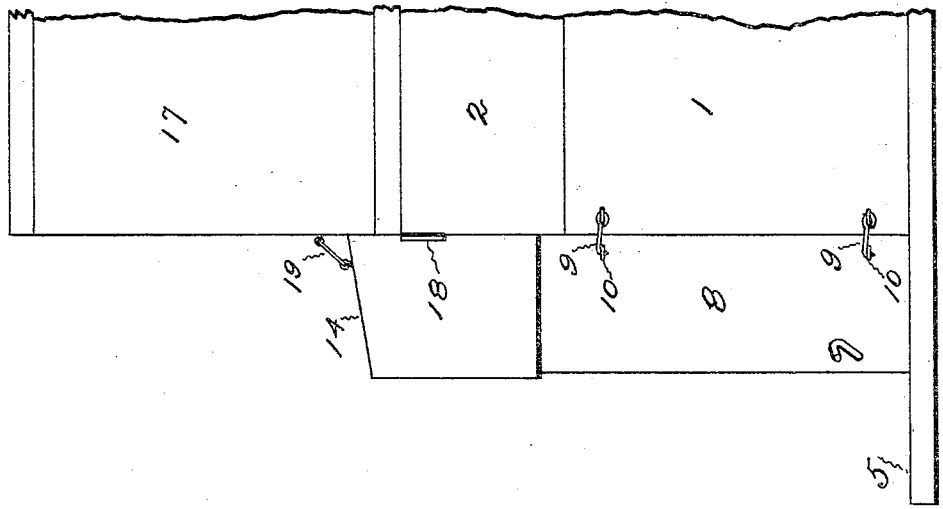
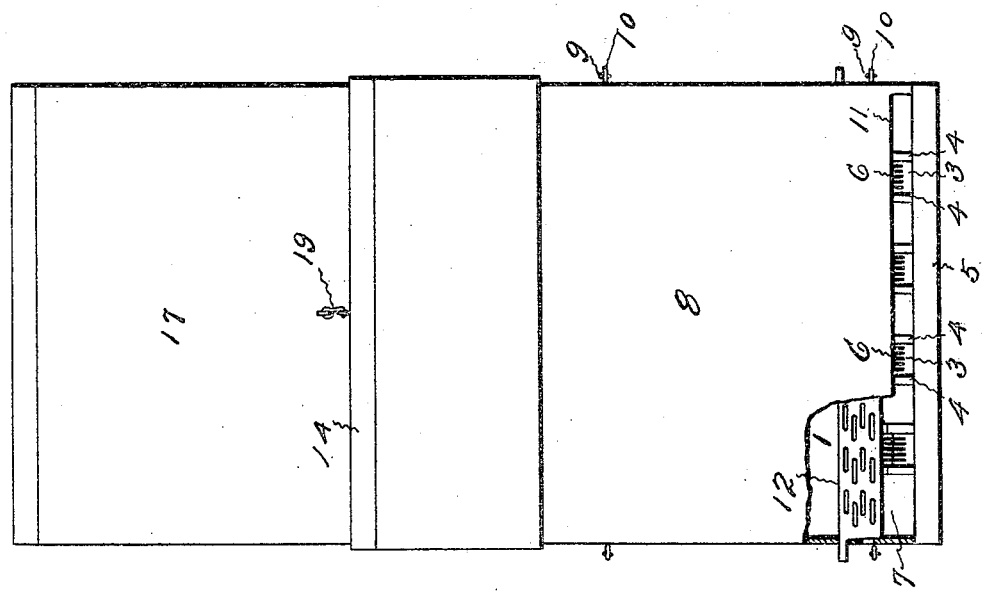
Witnesses:
Howard L. Holcomb
Josephine M. Strempfer
Inventor:
George T. Whitten, by
Harry P. Williams
atty.

G. T. WHITTEN.
BEEHIVE ENTRANCE GUARD AND SWARM CONTROLLER.
APPLICATION FILED JAN. 29, 1910.
956,615.
Patented May 3, 1910.
2 SHEETS—SHEET 2.
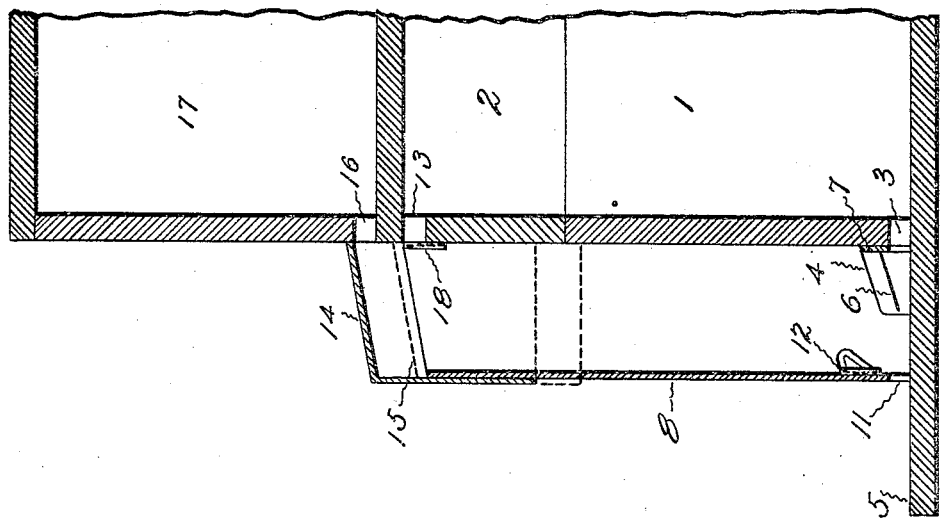
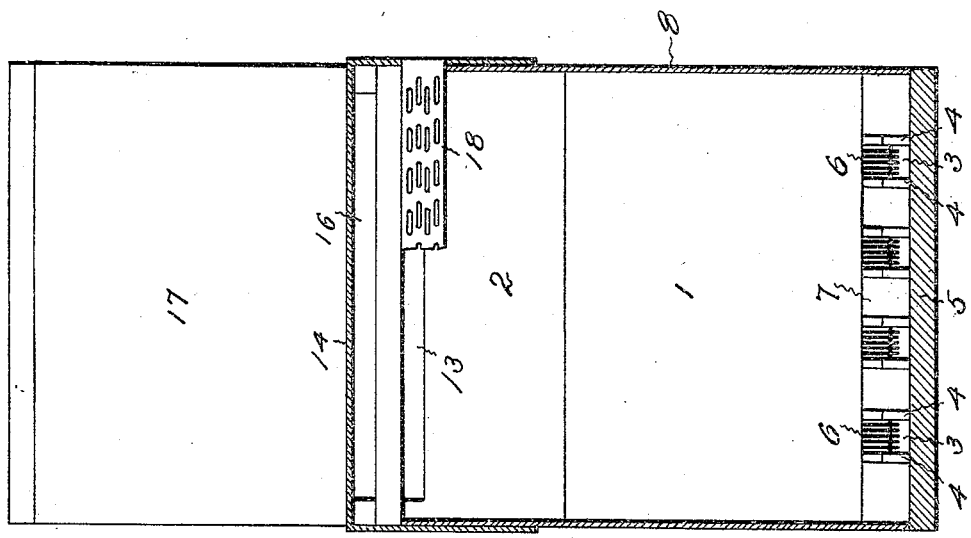
Witnesses:
Howard L. Holcomb
Josephine M. Strempfer
Inventor:
George T. Whitten, by
Harry R. Williams,
atty.

UNITED STATES PATENT OFFICE.

GEORGE T. WHITTEN, OF HARTFORD, CONNECTICUT.

BEEHIVE-ENTRANCE GUARD AND SWARM-CONTROLLER.

956,615. Specification of Letters Patent. Patented May 3, 1910.

Application filed January 29, 1910. Serial No. 540,792.

*To all whom it may concern:*

Be it known that I, GEORGE T. WHITTEN, a citizen of the United States, residing at Hartford, in the county of Hartford and State of Connecticut, have invented a new and useful Improvement in Beehive - Entrance Guards and Swarm - Controllers, of which the following is a specification.

Beehives, as commonly constructed, have a lower chamber or brood-hive, and an upper chamber or super. These chambers contain the comb frames and foundation. The entrance to these is usually at the bottom of the brood-hive. The queen lays her eggs in the comb cells of the brood-hive, so the cells in this section contain honey, eggs and young bees in various stages of development, and consequently the honey in the brood-hive has practically no commercial value. The surplus honey is deposited by the working bees in the comb of the super. This contains no eggs and young, and therefore is that which is removed and used or sold. With an entrance at the bottom of the brood-hive, the bees first pass into the brood-hive, and then if the conditions are right, they pass into the super. As a result of this the tendency of the bees is to first fill the brood-hive. But a relatively small quantity of clear commercial honey is deposited in the super, for the bees are inclined to stop in the brood-hive. When the brood-hive becomes crowded, and often before the super is filled with honey, the young bees with a queen are quite likely to swarm, and if they escape and swarm in the open, it is an arduous task to collect them into a new hive.

The object of this invention is to provide a very simple, cheap and easily applied attachment for hives, which is so designed that while not obstructing the egress of the bees from the bottom of the brood-hive, it will prevent the entrance of the bees at that locality, and direct them to the super, in order to lead them to deposit honey in the super before they do in the brood - hive. This tends to relieve the brood-hive of crowding, and thus lessens the liability of swarming, before the super is filled, and insures the gathering of a relatively larger amount of honey of commercial quality.

This invention also provides means which may be utilized for controlling the queen and young bees, when the brood-hive becomes crowded and they incline to swarm, whereby the new swarm will be directed to a new hive which is placed on the top of the super, and which can be removed and located on a new base for the establishment of another colony, when the swarm is collected therein. Thus the swarm with its queen will be hived without handling.

This attachment also provides a guard against robber bees, and also prevents the obstruction of the exits by drones or returning workers.

Figure 1 of the accompanying drawings shows an elevation of a brood-hive, super, and new hive on the super, with an attachment which embodies this invention applied to the front. Fig. 2 is a side view of a portion of the front end of the same hives and super with the attachment in position. Fig. 3 shows a vertical section of the attachment and a front view of the brood-hive, super and new hive. Fig. 4 is a vertical section of the attachment and front portion of the hives and super.

The brood-hive 1 and the super 2 may be of any desired form, material and construction. These will contain the usual comb frames and foundation. The brood-hive may have the usual single opening, but preferably has a number of openings 3, through the bottom of the front wall. Each side of these openings is a guard wall 4 that extends forward from the front wall of the brood-hive on the lighting or bottom board 5. Projecting forwardly and downwardly in front of the openings, and between the guard walls at the sides of the openings, are spring fingers 6. These fingers are preferably made of light flexible pieces of spring steel or other metal and they are so arranged that bees can freely pass out of the openings between the guard walls and under the ends of the fingers, but cannot enter the brood-hive through these openings. These spring fingers and the guard walls on each side may be attached directly to the front wall of the brood-hive adjacent to the exit openings, or they may be attached to a piece 7 which can be fastened to the front of the brood-hive over the usual entrance.

A casing 8, which may be made of wood or metal of any desired size, is placed on the lighting board in front of the exit openings. This casing may be secured in position by means of hooks 9 and eyes 10 attached on the sides of the parts. An opening 11 is left across the bottom of the front of this casing. A queen excluding screen 12 of common construction may be arranged in the casing so that it can be dropped down over this opening or raised above it, as shown in the views.

The super may have an opening at the bottom, but preferably has an entrance opening 13 through the front wall at the top. It is desirable to make the upper part of the casing telescopic, so that the top 14 may be arranged just above the level of the opening into the super, as shown by dotted lines 15 in Fig. 4, or may be raised above the level of the entrance opening 16 into the new hive 17, which is temporarily placed on top of the super, as is shown in full lines in Fig. 4. A queen excluding screen 18 is shown as arranged at the back edge near the top of the casing in such position that it may be used to screen the entrance to the super for the purpose of excluding queens and drones therefrom. Any convenient means may be employed for holding the upper portion of the casing with the top at the desired level, such for instance as a hook and eye 19.

This attachment can be easily and quickly applied to and fastened in front of any ordinary beehive, or removed therefrom when desired. When it is applied, working bees can pass out freely through the openings at the bottom of the brood-hive and out at the bottom of the front of the casing. Returning bees, however, on account of the spring fingers, cannot enter the brood-hive through the openings at the bottom. After they enter through the opening in the front of the casing and encounter the spring fingers, they pass to one side of the guard walls, that are at the sides of the spring fingers, and then travel upward to the top of the casing, and pass through the opening into the super and then down through the brood-hive and out. This requires the workers to first enter the super rather than first enter the brood-hive and then the super. As a result of this, a relatively large amount of clear honey is deposited in the super, where it is free from eggs and young. When the bees show a tendency to swarm, a new hive can be placed on top of the super, as shown, and the top of the casing raised above the entrance opening into this new hive. Then the queen excluder is arranged to protect the opening at the bottom of the casing. This permits the working bees to pass in and out freely, but prevents the queen from passing out. When the queen leaves the brood-hive, as she cannot escape, she travels up through the casing and into the new hive at the top. Then the young bees which have swarmed, possibly on a tree or bush outside, finding that their queen is not with them, return into the casing and follow her into the new hive on top. After the queen and swarm are gathered in the new hive, a screen may be placed over the entrance, and this hive removed to another lighting board or hive bottom, and a new colony established. The top of the attachment is then lowered so that the bees which remain with the old hive will pass in and up to the super, as before. The hive with the new colony may be provided with one of these attachments and the process repeated.

The invention claimed is:

1. An attachment for a beehive which has an upper and lower opening, said attachment having means which permits the egress only of bees from the bottom opening of the hive, and a casing adapted to inclose said egress opening and the opening above, whereby returning bees are prevented from entering through the bottom opening, and are directed to the upper opening into the hive.

2. An attachment for hives having means which permits the egress of bees from the bottom of the hive, and a casing inclosing the opening at the bottom and an entrance opening at the top, said casing being telescopic, whereby it may be raised to inclose an opening into a hive placed on top of the original hive.

3. A casing designed to be attached to a beehive over its opening, said casing being extensible so that it may be arranged to inclose the opening to a hive temporarily placed on top of the original hive.

4. The combination with a beehive having openings at the bottom, of guard walls arranged adjacent to the openings at the bottom of the hive, spring fingers arranged to permit the egress but prevent the entrance of bees between said walls, through the openings at the bottom of the hive, a super with an opening thereinto, and a casing inclosing the guarded openings at the bottom of the hive and also the opening to the super.

5. An attachment adapted to be secured to the front of a beehive, having a telescopic casing with an opening through the front at the bottom, a queen excluder arranged adjacent to said opening, and spring fingers arranged to guard the opening through the bottom of the front of the hive and while allowing the egress of bees through said opening, preventing the entrance to the hive of bees therethrough.

GEORGE T. WHITTEN.

Witnesses:
JOSEPHINE M. STREMPFER,
HARRY R. WILLIAMS.